US005169704A

United States Patent [19]

Faust et al.

[11] Patent Number: 5,169,704

[45] Date of Patent: Dec. 8, 1992

[54] DECORATIVE INLAID SHEET MATERIALS HAVING MULTIPLE PRINTED LAYERS

[75] Inventors: Kenneth J. Faust, Nazareth; Rolf Basler, Macungie, both of Pa.

[73] Assignee: Tarkett Inc., Parsippany, N.J.

[21] Appl. No.: 635,663

[22] Filed: Dec. 27, 1990

[51] Int. Cl.$^5$ .............................. B32B 3/00

[52] U.S. Cl. .............................. 428/143; 428/46; 428/141; 428/195; 428/204; 428/206; 428/207; 428/327; 428/402

[58] Field of Search .................. 428/46, 49, 195, 204, 428/206-207, 327, 402, 908.8, 913.3, 143

[56] References Cited

U.S. PATENT DOCUMENTS 3,978,258 8/1976 Faust et al. .............. 428/159
4,675,212 6/1987 Wiley et al. .............. 427/244
4,863,782 9/1989 Wang et al. .............. 428/204
4,916,007 4/1990 Manning et al. .............. 428/203

*Primary Examiner*—Patrick J. Ryan
*Assistant Examiner*—Elizabeth Evans
*Attorney, Agent, or Firm*—Brooks Haidt Haffner & Delahunty

[57] ABSTRACT

Decorative sheet materials, particularly inlaid sheet vinyl floor coverings, are prepared with two or more printed layers provided that at least two of the printed layers are separated by an adhesive matrix layer which contains particles. The adhesive matrix layer and the printed layer or layers overlaying the adhesive matrix layer allow the underprinted layer to show through. The underprinted layer, therefore, is visible and the decorative sheet material has exceptional visual depth.

17 Claims, 2 Drawing Sheets

DECORATIVE INLAID SHEET MATERIALS HAVING MULTIPLE PRINTED LAYERS

BACKGROUND OF THE INVENTION

1. Field of the Invention

The present invention has to do with decorative inlaid sheet materials such as floorcoverings having two or more printed layers. More particularly, the invention relates to the use of multiple printed layers wherein at least two of the printed layers are separated by a matrix layer containing particles to make a product having superior visual depth.

2. Description of the Related Art

Sheet materials, in particular sheet vinyl flooring products made with particulate materials, are commonly referred to as inlaids. These products and processes for their manufacture are well known in the floor covering art and originate back to the early linoleum times where through-patterned floor coverings, based on linseed oil, cork dust and resins were developed by the industry. The process was later modified for vinyl.

Vinyl inlaid floor coverings are generally made either by embedding particulate materials into a plastisol or by compacting (or sintering) particulate materials into a patterned mass. Various printing techniques are used to create desired design effects for most applications.

Decorative sheet-type materials having multiple printed layers are known in the art. U.S. Pat. No. 3,978,258 to Faust et al. discloses an embossed decorative surface covering material such as sheet vinyl flooring which can include two printed layers separated by a cured, foamed plastic layer. Another decorative surface covering having two printed layers is described in U.S. Pat. No. 4,675,212 to Wiley et al. The two printed layers in Wiley et al. are separated by a substantially translucent or transparent layer and the second printed layer, overlaying the translucent or transparent layer, is comprised of an ink containing decorative particles which is selectively deposited.

Inlaid floor coverings having particulate materials embedded in a plastisol are described in U.S. Pat. No. 4,212,691 to Potosky et al. which discloses a method for making inlaid sheet materials using decorative chips or flakes. The chips or flakes are deposited on a layer of wet, tacky, ungelled plastisol which is optionally printed. As the chips or flakes are deposited, the ungelled plastisol is continuously moving forwardly and upwardly at an angle greater than the angle of repose for the decorative chips or flakes. At the same time, the surface of the ungelled plastisol is vibrated so that excess chips or flakes which have not adhered to the surface slide backwardly toward the place where they were deposited. The chip or flake coated surface is then processed under pressure at elevated temperatures whereby the wet, tacky, ungelled plastisol and the decorative chips or flakes are compressed into a single layer and the ungelled plastisol is transformed into a gelled plastisol.

In Kaminsky U.S. Pat. No. 4,126,727, resinous polymer sheet materials having selective decorative effects are disclosed. The sheet materials comprise a resinous polymer layer which is printed with a pattern or design having relatively dark and relatively light colored portions. The printed layer is coated with a second resinous polymer layer having decorative chips or flakes embedded therein. The decorative chips or flakes are relatively small or flat and comprise a very thin layer of translucent or transparent platelets having a refractive index relative to surrounding material which causes certain light wave interference and color absorptive effects. The product has a non-uniform nacreous appearance.

Instead of the chips, flakes or granules heretofore generally used in the production of inlaids, it has recently been found advantageous to use spheroidal resinous particles, sometimes referred to in the art as pearls, beads or color crystals, for certain applications. A method for preparing such spheroidal resinous particles from plasticized polyvinyl chloride (PVC) is disclosed in Erb. U.S. Pat. No. 3,856,900.

Residential floor coverings having a layer of spheroidal resinous particles in a resinous polymer layer overcoating a printed pattern or design are described in U.S. Pat. No. 5,015,516. The spheroidal resinous particles may be transparent, translucent or opaque; colored or non-colored. However, the matrix layer containing the particles must be sufficiently transparent or translucent to allow the underprint to show through so that the printed pattern or design will be visible.

Commercial floor coverings having a dense layer of spheroidal resinous particles are described in U.S. patent application Ser. No. 362,344, filed Jun. 6, 1989. In this case, the particles are deposited in sufficient density to essentially prevent the underlying layer or layers from showing through.

It has now been found in accordance with the present invention that inlaid sheet materials having superior and unexpected visual depth can be manufactured by separating at least two printed layers with an adhesive matrix layer containing particles, preferably spheroidal resinous particles, wherein said adhesive matrix layer permits the underprint to show through so that the underprinted layer will contribute to the visual effect of the end product.

SUMMARY OF THE INVENTION

In accordance with this invention, inlaid floor coverings having exceptional visual depth are prepared by applying a foamable, wet plastic layer to a sheet substrate followed by gelling. A first printed layer is then applied to the surface of the foamable, gelled plastic layer. The first printed layer is then overlayed with a wet, plastic adhesive layer in which particles were previously dispersed or are subsequently embedded. The wet, plastic adhesive layer containing particles is then gelled to form a matrix layer (sometimes referred to herein as an adhesive matrix layer). A second printed layer is then applied over the matrix layer. Then the second printed layer is overlayed with a wearlayer followed by fusing and expanding the product.

In a preferred embodiment of the invention, a wet, plastic adhesive layer is applied to the surface of the first printed layer followed by applying spherical or essentially spherical (herein referred to as "spheroidal") resinous particles to the surface of the wet, plastic adhesive layer and then embedding the particles therein. The wet, plastic adhesive layer containing particles is then gelled to form a matrix layer and smoothed. A smoothcoat layer is applied to the matrix layer and gelled before overprinting with the second printed layer.

BRIEF DESCRIPTION OF THE DRAWINGS

FIG. I is a fragmentary sectional view through a preferred floor covering material of the invention. In this view it is not intended that the thicknesses of the various layers of components shown or the sizes of the particles are precisely represented. Rather, the various layers are represented on a considerably enlarged scale and without showing precise relationships between the thicknesses of the various layers or the sizes of the particles.

FIG. II is a flow sheet diagram representing a preferred process for making the product depicted in FIG. I.

DESCRIPTION OF THE PREFERRED EMBODIMENTS

Figure 1:
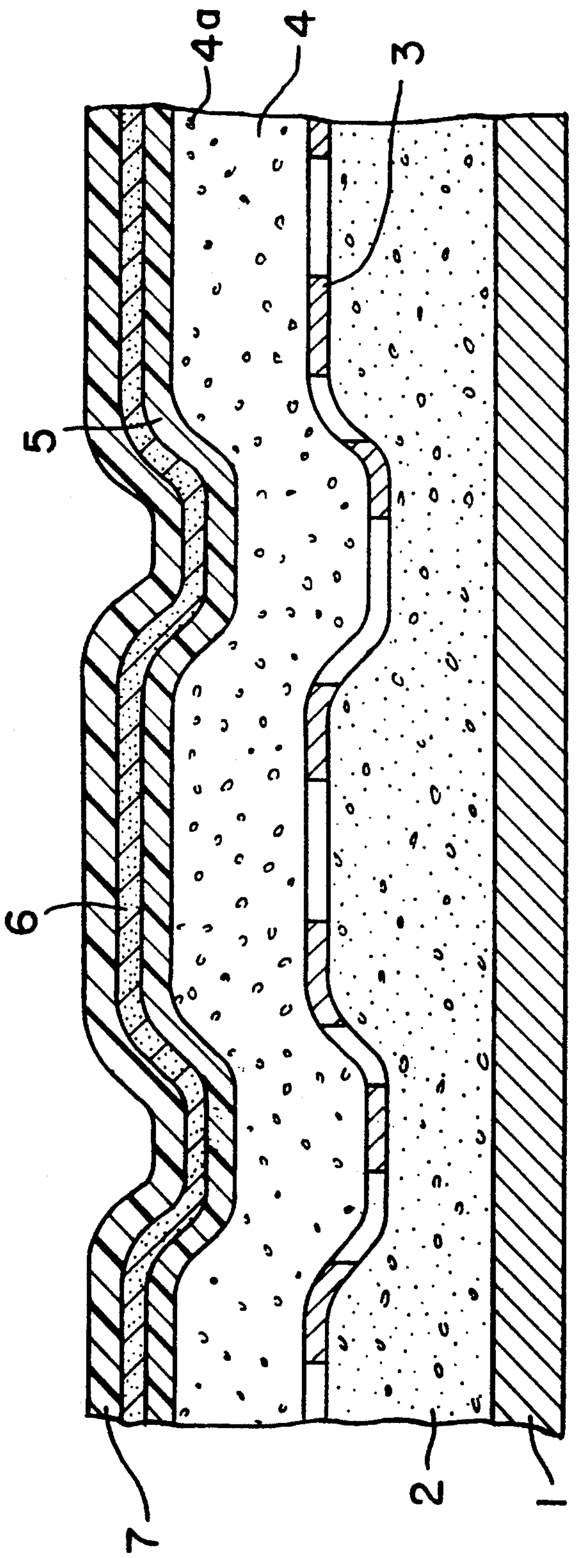
Figure 2:
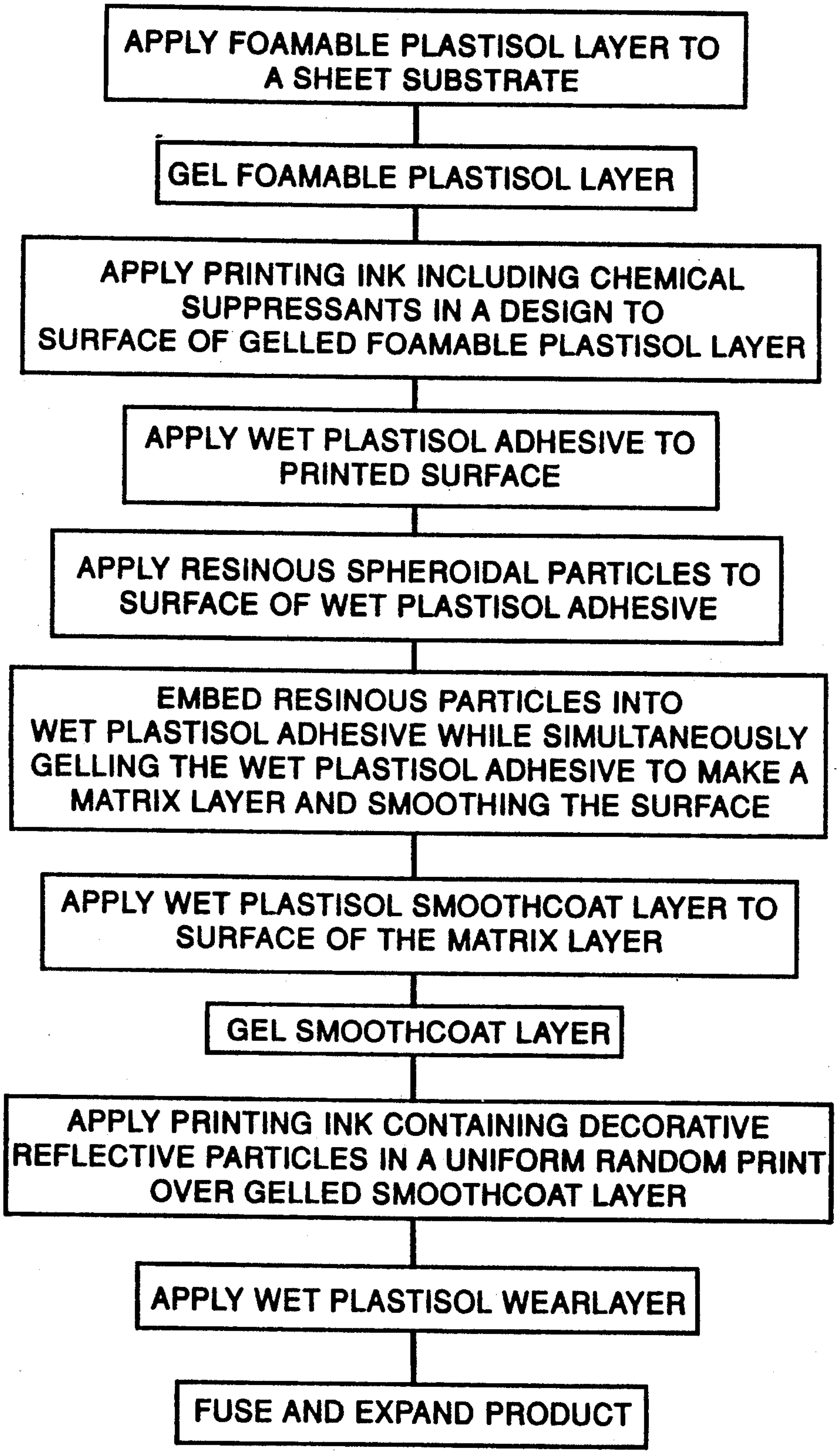

Referring to FIG. I, the sheet substrate 1 is overlayed by a chemically embossed, foamed plastisol layer 2. The first printed layer 3 is comprised of an inorganic or organic pigmented ink containing chemical suppressants applied in the form of a design. The matrix layer 4 is comprised of a plastisol containing spheroidal resinous particles 4a and is overlayed by a plastisol smoothcoat layer 5. The second printed layer 6 is comprised of a translucent, colored, uniform print containing an inorganic or organic pigment and randomly dispersed decorative reflective particles. Wearlayer 7 overlaying the second printed layer is comprised of a plastisol.

The floor covering product of FIG. I is manufactured according to FIG. II by applying a layer of a foamable, wet plastisol composition to a sheet substrate using conventional techniques. The combination is then heated to gel the plastisol without activating the foaming agent. (The following description includes alternative embodiments in addition to the FIG. I embodiment.)

A pigmented ink containing chemical suppressants is then applied uniformly or in a design to the surface of the foamable, gelled plastisol layer using conventional printing techniques. One or more layers of ink can be applied uniformly or in a design.

A clear, wet, plastisol adhesive layer is conventionally applied over the printed surface. While the plastisol adhesive is still wet and tacky, a mixture of transparent, translucent and opaque, colored and non-colored, resinous spheroidal particles are applied over the wet, plastisol adhesive layer using a dry material dispensing machine of the type described later in this specification. The resinous particles are embedded in the wet plastisol using a hot chrome drum which simultaneously gels the plastisol and smooths the surface. Gelling heat is sufficient to cause gelling without activating the foaming agent in the foamable, gelled plastisol layer. As noted above, the gelled plastisol adhesive containing particles is referred to in this specification as the matrix layer or the adhesive matrix layer. It is important that the matrix layer is sufficiently transparent or translucent and the density of the particles therein is such that the first printed layer is visible through the matrix layer.

A wet, plastisol smoothcoat layer is then applied to the matrix layer and gelled with heating. Again, the heat used is not sufficient to activate the foaming agent in the foamable, gelled plastisol layer.

An ink containing decorative reflective particles is then conventionally applied to the surface of the smoothcoat layer in a uniform coating with the decorative reflective particles randomly dispersed over the surface. Alternatively, this ink can be selectively deposited over the surface in the form of a pattern or design. This ink can be clear or can contain inorganic and/or organic pigments.

Other inks containing organic and/or inorganic pigments may be uniformly and/or selectively deposited before and/or after application of the ink containing decorative reflective particles to compliment the deposition of the decorative reflective particles. This second printed layer is transparent and/or translucent so that the first printed layer is allowed to show through. In other words, the second printed layer supplements the first printed layer so that both printed layers have visual effects in the end product.

Finally, a clear, wet, plastisol wearlayer is applied over the second printed layer followed by sufficient heating to fuse the product and activate the foaming agent. (Activating the foaming agent is referred to in the art as expanding the product.) A urethane wearlayer can also be applied and cured after the product is expanded. Alternatively, a heat curable urethane wearlayer can be applied to a gelled plastisol wearlayer prior to expanding the product.

Each component of the product and process of the invention will now be described with reference to various preferred and alternative embodiments.

THE SUBSTRATE

The substrate is a relatively flat, fibrous or non-fibrous, backing sheet material, such as a fibrous, felted or matted, relatively flat sheet of overlapping, intersecting fibers. The substrate can, if desired, comprise asbestos or non-asbestos (preferably non-asbestos) felts or papers which are woven or non-woven. It can comprise knitted or otherwise fabricated textile material or fabrics made from cellulose, glass, natural or synthetic organic fibers, or natural or synthetic inorganic fibers, or supported or non-supported webs or sheets made therefrom, or filled or unfilled thermoplastic or thermoset polymeric materials. These and other substrate base materials are well known in the art and need not be further detailed here.

In one embodiment of the invention, a release substrate is used to facilitate manufacture of a floor covering product which is flexible. Such products are capable of stretching or shrinking to accommodate movement of the underlying building material. They are also useful for covering existing flooring material which may have embossing or imperfections. The embossing or imperfections are hidden when covered with this type of flexible floor covering. These products are particularly useful for covering old flooring material which contains asbestos, since asbestos removal then can be avoided.

Release substrates are generally made from the same substrate materials as described above except that they further comprise a release coating. The release coating allows the substrate to be easily stripped from the layer overlying the substrate as the final step of the floor covering manufacturing process. Typical release coatings include methyl cellulose, carboxy methyl cellulose, silicone, fluorocarbon based compositions, and the like.

LATEX LAYER

The latex layer is optional and can be applied to one or both sides of the substrate. It is a smooth coating which may be colored or not colored, filled or unfilled. It can be substantially uniformly coated over the substrate to a thickness from less than about 0.1 to about 4 mils, and where a tinted layer is desired, preferably from about 1.5 to about 2.5 mils. Conventional means for coating the substrate with the latex layer can be used and are not critical to the invention. Such means include an air knife, a knurled rotogravure application (sometimes referred to as a plain etch), rotary screen, draw down bar, or wire wound bar (wherein the grooves provided by the wires assist in metering the flow of the latex).

Following application of the latex layer, it is dried prior to further processing. This can be accomplished in a hot air oven at a temperature from about 225° F. to about 350° F., preferably from about 275° F. to about 300° F., for from about 4 minutes to about 30 seconds, preferably from about 2 minutes to about 30 seconds. Lower temperatures and longer times may be used as long as conditions are adequate to remove water. Higher temperatures and shorter times may also be used with sufficient air velocity as long as the latex layer is not caused to bubble.

The latex layer can be made from any commonly available latex formulation as long as it is compatible with the substrate and the foamable plastic layer. The latex composition preferably should have minimal smoke generating properties and should be moisture resistant and have good aging properties. It should also have good adhesion compatibility with the foamable plastic layer. Suitable latexes include crosslinkable ethylene, vinyl acetate latexes, crosslinkable acrylic latexes, ethylene vinyl chloride emulsions, PVC and polyvinyl acetate latexes, PVC and polyvinyl acetate copolymer latexes and butadiene-acrylonitrile latexes.

FOAMABLE PLASTIC LAYER

The foamable plastic layer may be comprised of any suitable material known in the art for producing foamed plastic layers on covering materials, but is preferably a PVC plastisol or organosol. This layer can be pigmented or be free of pigmentation. If the layer is pigmented, a color is preferably selected which is the average of the colors of the end product so that the appearance and aesthetics of the product are maintained during its working life. To one skilled in the art, the average color means the color perceived when one looks at a surface from a distance of more than about five feet.

As used herein the term "plastisol" is generally intended to cover a relatively high molecular weight PVC resin dispersed in one or more plasticizers. The plastisol upon heating or curing forms a tough plasticized solid. For purposes of this specification, plastisol compositions are also intended to include organosols, which are similarly dispersed PVC resin materials that, in addition, contain one or more volatile liquids which are driven off upon heating.

The foamable plastic layer may include any of the various PVC resin materials normally used in connection with coating of decorative sheet materials and may specifically include, but are not limited to those described in U.S. Pat. No. 3,458,337. While a suitable blowing agent as taught by the above-mentioned patent may be used, a blend of azodicarbonamide (ABFA) and p,p'oxybis (benzene sulfonyl hydrazide) (OBSH) blowing agents can be used instead. Additional conventional ingredients such as stabilizers, blowing agent catalysts, etc. can be used. In a preferred embodiment of the invention, the PVC resin used comprises both dispersion and blending resin in ratios from about 1:2 to about 3:1 dispersion resin to blending resin.

Although the preferred foamable plastic layer is a PVC homopolymer resin, other vinylchloride resins can be employed. Exemplary are vinylchloride-vinylacetate copolymers, vinylchloride-vinylidinechloride copolymers and copolymers of vinylchloride with other vinyl esters, such as vinylbutyrate, vinylpropionate and alkyl substituted vinyl esters, wherein the alkyl moiety preferably is lower alkyl containing between about 1–4 carbons. Other suitable synthetic resins such as polystyrene, substituted polystyrene (preferably wherein the substituents are selected from the group consisting of alkyl having 1–10 carbons preferably 1–4 carbons, and aryl having 6–14 carbons), polyolefins such as polyethylene and polypropylene, acrylates and methacrylates, polyamides, polyesters and any other natural or synthetic resin.

The composition of the foamable plastic layer must be compatible with the underlying substrate or latex layer and the first printed layer of this invention and must provide a smooth and uniform surface for the first printed layer. The composition also must be otherwise compatible with the overall product composition and, therefore, within the principles of this invention. Thus it is not essential that a plastisol always be used. Organosols and aqueous latexes are also of use, employing as the dispersing or suspending media, organic solvents and water, respectively, rather than plasticizers as in the case of a plastisol.

When the preferred plastisol is employed, typical plasticizers which can be used are dibutyl sebacate, butyl benzyl sebacate, dibenzyl sebacate, dioctyl adipate, didecyl adipate, dibutyl phthalate, dioctyl phthalate, dibutoxy ethyl phthalate, butyl benzyl phthalate, dibenzyl phthalate, di(ethylhexyl) phthalate, alkyl or aryl modified phthalate esters, tricresyl phosphate, octyl diphenyl phosphate, dipropylene glycol dibenzoate, dibasic acid glycol esters and alkyl aryl or alkyl aryl hydrocarbons and the like.

Those skilled in the art will appreciate that in addition to the basic resin constituents, other commonly employed constituents can be present in plastisols. These can include conventional stabilizers/accelerators initiators, catalysts, etc., such as zinc oleate, dibasic lead phosphite, etc., conventional heat or light stabilizers, such as metallic soaps, etc., ultraviolet absorbers, colorants, dyes or pigments, notably titanium dioxide, solvents and diluents, such as xylene, mineral spirits, dodecyl benzene, etc., fillers such as clay, limestone, etc., viscosity modifiers, antioxidants, bacteriostats and the like.

The foamable plastic layer is substantially uniformly applied in its wet state to the underlying surface by conventional means such as a knife-over roll coater, direct roll coater, rotary screen, draw down bar, reverse roll coater or wire wound bar. The particular means for applying the layer does not relate to the essence of the invention, and any suitable coating means can be employed.

The thickness of the foamable, wet plastic layer as it is applied to the underlying surface is substantially uniform and is in the range from about 3 to about 30 mils, preferably from about 6 to about 16 mils. The layer can be thicker or thinner as may be required by the particular product application. If the floor covering product is to be chemically or mechanically embossed, however, the layer must be thick enough to allow embossing.

In the embodiment of the invention wherein a release substrate is used, the foamable, wet plastic layer is generally from about 10 to about 200 mils thick and preferably from about 30 to about 100 mils thick. Solid vinyl and/or chemically blown foams are generally used in this type of application. Mechanical foams which have had air whipped into them under pressure by a frothing machine also can be used. Mechanical foams can be comprised of plastisols with a silicone or organic surfactant, polyurethane, rubber latex such as styrene butadiene, acrylic, and other compositions which can be frothed into a mechanical foam as are known in the art. The whipped mechanical foams are applied to the release substrate using a knife over roll coater, roll over roll coater or other conventional means.

After the foamable, wet plastic layer is applied to the substrate, the combination is heated for a period of time and at a temperature sufficient to gel the plastic composition, but not sufficient to activate or to decompose the blowing or foaming agent present in the plastic composition. This can be done in an oven or on a heated chrome drum. If an oven is used for the gelling step, a residence time in the oven from about 0.6 minutes to about 3.5 minutes at an oven temperature from about 320° F. to about 250° F. will give good results. If a chrome drum is used, a dwell time on the drum of from about 8 seconds to about 30 seconds at a drum temperature of from about 310° F. to about 240° F. will give good results. The higher temperatures are used with shorter residence or dwell times and lower temperatures with longer times. The layer is then cooled to form a pre-gel which provides a surface suitable for printing. Cooling is generally accomplished by contacting the surface of the foamable, gelled plastic layer (and sometimes the underside of the substrate) with one or more cooling drums. Ambient or chilled water is circulated through the drums. Cooling may be enhanced with the use of fans or blowers.

THE FIRST PRINTED LAYER

The first printed layer can be in the form of a pattern or design or can be a plain uniform coating. It can be comprised of one or more layers of ink.

Suitable printing inks include those normally used in the manufacture of floor covering. These include plastisol solvent-based systems and water-based systems. Such systems can include a chemical suppressant in those cases where embossing effects are desired. Such suppressants are well known in the art (e.g., see U.S. Pat. No. 3,293,094). Ultraviolet curable printing inks can also be used.

The printing ink may be pigmented or non-pigmented and may include organic pigments or inorganic pigment particles such as titanium dioxide, chromium dioxide, cadmium sulfide, iron oxide, carbon black, mica and the like. Decorative reflective particles may also be included as part of the printing ink composition or may be separately applied either randomly or by selective deposition in the form of a pattern or design.

Printing can be effected by rotogravure, flexigraphic, screen printing, pad or knurled printing, or other printing techniques conventionally employed in making floor or wall covering products.

ADHESIVE LAYER

The adhesive layer is normally a plastisol or organosol additionally containing a plasticizer system, associated diluents, viscosity control aids and stabilizers. It is preferably a clear (transparent) layer but it can be slightly tinted so long as it is translucent.

The composition of the adhesive layer can be any of the compositions that are suitable for use in the foamable plastic layer, but preferably without the foaming or blowing agent.

While the adhesive layer can be foamable, it generally is not because foamed plastics generally lose some of their transparency or translucency. Preferably, the adhesive layer employed according to the invention is a clear, unfilled, resinous polymer composition, such as a PVC plastisol.

The adhesive layer is substantially uniformly applied to the underlying printed surface by conventional means such as a knife-over roll coater, direct roll coater, air knife, rotary screen, draw down bar, reverse roll coater or wire wound bar. The particular means for applying the adhesive layer does not relate to the essence of the invention and any suitable coating means can be employed.

The thickness of the adhesive layer, as it is applied in its wet, tacky, ungelled state to the underlying surface, is substantially uniform and is in the range from about 4 to about 30 mils, preferably from about 10 to about 20 mils. The wet, plastic adhesive layer can be thinner or thicker as may be required by the particular product application, as long as it is thick enough to accommodate the particles which are admixed with it or which subsequently will be embedded into it.

PARTICLES

Preferred particles are spheroidal because spheroidal particles not only provide visual depth, but when they are applied in accordance with the present invention they allow the underprint to show through the spaces or interstices between the particles. When some or all of the particles are transparent and/or translucent, the underprint is also allowed to show through the particles themselves. Chips and flakes can be used for certain design effects but they are less preferred because they tend to overlay one another and obscure the underprint.

The particles can be comprised of various homogeneous or heterogeneous polymeric or inorganic materials or mixtures thereof. Suitable particles can be made from any one, or a combination of materials, including PVC, plastisols, polyamides, polyolefins, polycarbonates, polyesters and other organic or inorganic materials.

The most preferred particles are spheroidal in shape and have an aspect ratio not greater than about 2:1. The spheroidal particles are preferably made from a PVC type dry blend (such particles being referred to herein as spheroidal resinous particles). The spheroidal resinous particles can be transparent, translucent or opaque and can contain their own individual colorants, pigments or dyes.

A preferred method of making the spheroidal resinous particles is to heat dry PVC by agitating it in a container provided with a propeller agitator, such as a Henschel Mixer, at a speed up to about 3,000 r.p.m., until it reaches a temperature of about 160° F. The agitator speed is then lowered to about 500 r.p.m. during addition of a PVC plasticizer, stabilizer and, if desired, a color dispersion. The agitator speed is then increased to about 3,000 r.p.m. until the temperature of the mixture reaches about 230° F. Then the agitator speed is lowered to allow cooling to about 100° F. and the spheroidal resinous particles thereby produced are discharged.

The spheroidal particles have a maximum length along their longitudinal axes (i.e., their longest dimension) of about 50 mils. The range in sizes of the spheroidal particles along their longitudinal axes is generally from about 4 to about 40 mils, with a range from about 15 to about 25 mils being preferred.

The particles can be admixed with (i.e., pre-dispersed within) the wet plastic adhesive before it is applied to the first printed layer. When this procedure is followed, the objective is to assure a uniform distribution of the particles as the wet plastic adhesive containing the particles is applied to the underlying surface. Preferably, however, the particles are applied to the wet, plastic adhesive layer after it is applied to the first printed layer. The particles can be applied uniformly or in various surface densities as long as a sufficient number are used to provide visual depth in the end product while allowing the underprint to have a visual effect on the overall appearance of the end product After the particles are applied to the wet, plastic adhesive layer, they are embedded into it as described later in this specification.

In order to achieve the desired effects in accordance with the preferred embodiment of the invention, spheroidal resinous particles are employed at a minimum density of about 0.05 pounds per square yard, with from about 0.15 to about 0.7 pounds per square yard being preferred. A density from about 0.3 to about 0.6 pounds per square yard is most preferred. When the particles are pre-dispersed within the wet plastic adhesive prior to application of the wet, plastic adhesive layer, a particle density from about 10% to about 30% by volume (i.e., particle volume to total volume of the matrix layer) is used. The density may be higher or lower depending on particle size and viscosity characteristics of the overall mixture and of the wet plastic adhesive itself.

Various means can be used to deposit the particles on the wet, plastic adhesive layer. Known apparatus such as a magnetic vibrating pan or trough or a VILLARS powder coater made by Villars Maschinenbau, Muenchwilen, Switzerland can be used. A particularly preferred means is to use a dry material dispensing machine of the type disclosed and claimed in Christy U.S. Pat. Nos. 3,070,264 and 3,073,607. Machines of this type are available from the Christy Machine Company, P. O. Box 32, Fremont, Ohio. The Christy "COAT-O-MATIC" (also called the "SIEVE-O-DUSTER") is particularly preferred.

The COAT-O-MATIC is normally used by the food industry to apply things like poppy seeds on rolls, sugar on cookies, and the like. However, it can easily be modified by one skilled in the art to uniformly deposit spheroidal particles in the production of floor coverings. The modifications are required to improve the uniformity of application of the spheroidal particles. In particular, the ability to make adjustments must be refined and vibrations and deflections must be reduced.

We found that the following modifications to the COAT-O-MATIC made it suitable for depositing spheroidal particles in accordance with this invention:

1. A larger diameter, knurled dispensing roll is used to reduce deflection and eliminate wobble which otherwise causes recurring bands of light and and heavy application of the spheroidal particles. The dispensing roll should have a total indicated run-out of less than or equal to about 0.010 inch, deflection due to weight of less than or equal to about 0.030 inch and a balance of less than or equal to about 2 inch ounces. The rigidity of the dispensing roll should be sufficient to prevent "galloping" (where the roll remains deflected in one orientation; thereby causing it to rotate like a banana).

2. An adjustable rubber applicator blade mounted on a reinforced holder is used to provide refined adjustment of the pressure for uniform application across the width of the machine.

3. Adjustment means are added to the brush holder to provide adjustment of pressure on the brush across the width of the machine.

4. Reinforcement of the hopper is required to limit deflections along its length. Deflections less than or equal to about 0.030 inch being preferred.

The foregoing modifications can be made by various means by those skilled in the art consistent with the objectives set forth above and elsewhere in this specification.

The density of spheroidal particles deposited using the modified COAT-O-MATIC can be adjusted for a given line speed by varying the speed of rotation of the dispensing roll.

EMBEDDING THE PARTICLES IN THE ADHESIVE LAYER AND GELLING THE ADHESIVE LAYER

When the particles are embedded in the wet, plastic adhesive layer, the layer is simultaneously gelled, thereby forming a matrix layer of spheroidal particles in a gelled adhesive. This can be achieved by heating the intermediate product in an oven at a temperature from about 260° F. to about 350° F., preferably from about 275° F. to about 300° F., for from about 4 minutes to about 1 minute, preferably from about 2.5 to about 1.5 minutes.

In a preferred embodiment of the invention, embedding and gelling are combined in one operation by using a hot chrome drum provided with a pressure belt as described in U.S. Pat. No. 4,794,020 to Lussi, et al. The drum is heated to a temperature from about 260° F. to about 350° F., preferably from about 275° F. to about 320° F. The intermediate product is maintained in contact with the drum for a dwell time from about 3 minutes to about 10 seconds, preferably from about 60 to about 15 seconds. In another embodiment, supplementary heat can be used, e.g., infrared or the like, prior to heating in an oven or on a drum, thereby shortening the heating times set forth above.

Gelling conditions will also vary with the molecular weight of the resin and other properties such as the solvating properties of the resin plasticizer. Those skilled in the art will recognize the importance of applying sufficient heat to gel the adhesive layer, while avoiding excessive heat which could damage the product.

SMOOTHCOAT LAYER

The smoothcoat layer can be made from the same material as is used in the adhesive layer. As with the adhesive layer, it is preferably a clear (transparent) layer but it can be slightly tinted so long as it is translucent. The smoothcoat layer is optional, but is used in the preferred embodiment of the invention to provide a smooth surface for the second printed layer.

The thickness of the smoothcoat layer, as it is applied in its wet, tacky ungelled state to the underlying surface, is substantially uniform and is in the range from about 2 to about 18 mils, preferably from about 4 to about 12 mils. The layer can be thinner or thicker as may be required by the particular product application, as long as it is thick enough to provide enhanced surface characteristics for printing.

The smoothcoat layer can be applied and then gelled in the same manner as the adhesive layer.

SECOND PRINTED LAYER

The second printed layer is comprised of the same types of printing inks as are suitable for the first printing layer except that they generally will not include chemical suppressants unless the underlying layer is foamable. The second printed layer can be comprised of one or more layers of ink.

The types and components of the inks used on each printed layer can be the same or different. For example, both layers can be printed with designs which may be in register or not, depending upon the desired decorative effects. As another example, the first printed layer can be printed in a design and the second printed layer can be a uniform transparent or translucent print containing decorative reflective particles. Other variations and combinations will be evident to those skilled in the art, bearing in mind that at least a part of the first printed layer must be visible through the second printed layer to obtain the desired decorative effects and visual depth.

PLASTISOL WEARLAYER

A coating of plastisol can be applied as a wearlayer over the second printed layer. This can be accomplished by using the same means used to apply the adhesive and smoothcoat layers. The coating of plastisol can then be gelled in an oven or with a hot chrome drum under the same conditions as described above with reference to gelling the adhesive layer. A plastisol wearlayer is thereby secured to the underlying surface. This process can be repeated to provide additional wearlayers as desired. After the last plastisol wearlayer is applied (or after the first plastisol wearlayer is applied if only one is used) the composite is heated sufficiently to fuse the product and activate the foaming agent.

The plastisol wearlayers each can have a thickness of from about 4 to about 40 mils.

In one embodiment, two clear plastisol wearlayers are used. After the first plastisol wearlayer is applied and gelled using a hot chrome drum, it is embossed at a temperature which will allow the embossing to be reversed upon the subsequent application of heat. Then a second plastisol wearlayer is applied followed by fusing in an oven. This causes the stresses created by embossing in the first wearlayer to relax, thereby causing a reverse embossing effect in the second wearlayer. A reverse embossed wearlayer is amenable to easy cleaning.

URETHANE WEARLAYER

Polyurethanes can also be used for the wearlayer in accordance with the invention. They can be used instead of plastisol or as an additional wearlayer (or wearlayers). A smooth coating of polyurethane can be applied using the same techniques as those used to apply smooth coatings of plastisol except where the surface is embossed; in which case it would be preferable to use a direct roll coater or an air knife coater. Polyurethane can also be applied by laminating it onto another substrate and applying it to a surface with an adhesive.

Depending upon the chemistry of the polyurethane, the polyurethane layer can be cured by heat, chemical reaction, ultraviolet light or electron beam radiation. A preferred means is high energy ultraviolet light.

The cured polyurethane layer can be from about 0.1 to about 10 mils thick and is preferably from about 0.25 to about 4 mils thick. Additional layers of polyurethane can be used if desired. In one embodiment of the invention, one polyurethane wearlayer is applied over the reverse embossed plastisol wearlayer described above. The product can be fused and expanded before or after application of the urethane wearlayer.

FLAME RETARDANTS AND SMOKE SUPPRESSANTS

Conventional flame retardants and smoke suppressants which are compatible with the various materials used in accordance with the invention can be added at any stage of the process. They can be impregnated into the substrate and/or admixed with any one or a combination of the latex layer, the foamable plastic layer, the adhesive layer, and any of the plastisol or urethane wearlayers. Resinous particles and other types of particles containing such compositions can also be manufactured for use in accordance with the invention.

Flame retardants and smoke inhibitors which can be used in accordance with the invention include aluminum trihydrate, zinc borate, magnesium hydroxide, antimony trioxide, phosphates and other compounds and compositions which are compatible with the various constituents of the products of the present invention. They are added in effective amounts which will be apparent to those skilled in the art based on manufacturers specifications and code requirements.

STATIC DISSIPATION

In order to adjust the electrical properties of the product of the invention, the formulation of the coating used in each layer and the composition of the substrate may need to be modified. The objective is to lower the resistance (raise the conductivity) of the product. Standards and testing procedures for surface to surface and surface to ground resistance for floor coverings are well known in the industry. A preferred range for static dissipative products is 1,000,000 to 1,000,000,000 ohms as tested per ASTM F-150-72 (standard test method for electrical resistance of conductive floor covering). This test is conducted at 500 volts direct current and 50% relative humidity.

In one embodiment of the invention, carbon fibers are incorporated into the substrate to lower its resistance. Antistatic agents that can be added to a latex layer, foamable plastic layer, adhesive layer and/or wearlayers are commercially available and known in the art. Suitable antistatic agents include Nopcostate HS, an ethoxylated composition from Diamond Shamrock and Tebestat IK 12, a nonionic substituted polyether from Dr. Th. Boehme KG, Chem. Fabrik GMBH & Co., 8192 Geretsried 1, Germany. The particular compositions used are not critical as long as they are compatible with the other components present in the durable inlaid floor coverings of the invention. The antistatic agents may be added in various amounts as will be apparent to those skilled in the art depending on recommendations of the manufacturers of said compositions and the desired specifications for the floor covering product. A polyurethane wearlayer is not used in preferred static-dissipative embodiments of the invention.

Several variations using the principles of the invention will be apparent to those skilled in the art in view of the foregoing disclosure. For example, additional printed layers may be used which might or might not be separated by matrix layers or plastic layers which do not contain particles, as long as at least two printed layers are separated by a matrix layer which allows the underprinted layer to show through. Decorative reflective particles may also be applied at various stages of the process by themselves or as part of a printing ink. They may be selectively deposited or randomly dispersed. Mechanical or chemical embossing or both can be used as will be apparent to those skilled in the art.

The following are some examples of preferred embodiments of the invention.

EXAMPLE I

Residential floorcovering with multilayer printing and embossing

A floorcovering sheet of conventional type non asbestos felt (Tarkett Inc., 1139 Lehigh Avenue, Whitehall, Pa. 18052 USA) approximately 31 mils thick was coated with a foamable plastisol the composition of which was as follows:

| | Parts by Weight |
|---|---|
| PVC dispersion: K value 65 (Occidental Oxy 605) | 70 |
| PVC extender resin: K value 60 (Goodyear Pliovic M-50) | 30 |
| Butyl Benzyl Phthalate | 41 |
| Linear alkyl benzene | 17.5 |
| Calcium Carbonate | 20 |
| Titanium Dioxide | 3.8 |
| Epoxy soya oil | 4.0 |
| Azodicarbonamide | 1.9 |
| Zinc Oxide | 1.5 |

The coated substrate is gelled in a hot oven at 275° F. for 2.5 minutes.

The gelled surface is gravure printed on a flat bed press using solvent based PVC—polyvinyl acetate copolymer ink having the following composition:

| | Parts by Weight |
|---|---|
| PVC - polyvinyl acetate copolymer | 100 |
| Pigments | 180 |
| Solvent (Methyl ethyl ketone/xylene) | 600 |
| Dispersion aid | 2 |

The pigments are a blend of colors comprised of red oxide, yellow oxide, cadmium yellow, cadmium orange, carbon black titanium dioxide, quinanthrene red, phthallo blue and phthallo green.

After drying in a warm air oven at 140° F., an adhesive layer about 10 mils thick was applied by drawdown bar and an application of premixed PVC pearls was evenly distributed on the surface of the wet, tacky adhesive layer at a level of about 0.35 lb./square yd. from a Christy powder coater. About half the pearls were transparent and the remainder colored. The adhesive composition has the following composition:

| | Parts by Weight |
|---|---|
| PVC dispersion: K value 68 (Occidental Oxy 68HC) | 75 |
| PVC extender: K value 59 (Goodyear Pliovic M-50) | 25 |
| Butyl benzyl phthalate | 12 |
| Linear Alkyl Benzene | 12 |
| Texanol isobutyrate (Eastman TXIB) | 13 |
| Barium-zinc stabilizer (Ferro 6241) | 4.65 |
| Epoxy soya oil | 4.65 |

The pearl particles have the following composition:

| | Parts by Weight | |
|---|---|---|
| | White | Clear |
| Suspension grade PVC resin K value 65 (Pevikon S 658 GK, coarse grade) | 100 | 100 |
| Butyl Benzyl Phthalate | 33 | 33 |
| Barium-zinc stabilizer (Ferro 6241) | 4 | 4 |
| Titanium dioxide | 5 | 0 |

Approximately 1% of the finished pearl blend contains colored pearls produced with blends of red oxide, yellow oxide phthalo blue and krolor orange.

The resin pearls have an aspect ratio of about 1 (the particles are essentially round) and the particle size averages about 400 microns. The pearls were embedded in the adhesive and the adhesive was then gelled by contacting the coated side against a heated chromium drum (340° F.), and simultaneously smoothed between a rubber pressure roll and the drum surface. The thickness of the adhesive coat and embedded pearls (the matrix layer) was about 20 mils.

The surface of the matrix was then bar coated using a drawdown bar with a transparent plastisol smoothcoat having the same composition as the adhesive layer. The smoothcoat surfaced was gelled against a hot chromium drum (340° F.) and smoothed between the drum surface and a rubber pressure roll. Total thickness of the adhesive matrix and smoothcoat was about 23 mils.

The smoothcoated intermediate product was printed with an overall knurled cylinder to apply a random deposition of reflective particles over the entire surface. The deposition was translucent enough to allow the pearls and lower print to show through. This ink was dried in a hot air type oven at 140° F. The composition of clear ink was as follows:

| | Percent by Weight |
|---|---|
| Titanium dioxide - coated mica reflective particles (Afflair 163) | 16 |
| Clear PVC based carrier (Custom Chemical CVS 1366 Clear) | 60 |
| Solvent blend (Eaken Chemicals Solvent C) | 24 |

A plastisol wearlayer approximately 7 mils thick was applied over the printed smoothcoated construction. The product was fused and expanded in a hot air oven for 3 minutes at 400° F.

The plastisol wearlayer has the following composition:

| | Parts by Weight |
|---|---|
| Dispersion resin, K value 75 (Occidental Oxy 75HC) | 75 |
| Extender resin, K value 66 (Goodyear Pliovic M-70) | 25 |
| Di-isononyl phthalate | 5 |
| Texanol isobutyrate (Eastman TXIB) | 5 |
| Barium-zinc stabilizer (Ferro 6241) | 7.5 |
| Epoxy soya oil | 1.0 |
| Butyl benzyl phthalate | 19.5 |
| Linear Alkyl Benzene | 13.5 |

Urethane was then applied with a direct roll coater over the embossed surface at a caliper of 2 mils. The coating was cured in an ultraviolet oven at a speed of 40 feet per minute under 2 lamps at 200 watts each.

EXAMPLE II

The process of Example I was followed except that a print of selectively deposited standard ink was used to compliment the knurled random deposition of reflective particles in the second print layer over the printed smoothcoated construction.

A urethane wearlayer is not applied to this sample.

Having set forth the general nature and some preferred embodiments of the present invention, the scope is now more particularly set forth in the appended claims.

What is claimed is:

1. A surface covering which comprises:

a) a backing sheet material;

b) a plastic layer overlaying said backing sheet material;

c) a first printed layer overlaying said plastic layer;

d) an adhesive matrix layer, which contains spheroidal particles having an aspect ratio not greater than about 2:1, overlaying said first printed layer;

e) a second printed layer overlaying said matrix layer; and f) a wearlayer overlaying said second printed layer, wherein said first printed layer is visible through the layers overlaying it.

2. The surface covering of claim 1 wherein the second printed layer is in the form of a design.

3. The surface covering of claim 2 wherein the first printed layer is in the form of a design.

4. The surface covering of claim 2 wherein the second printed layer contains decorative reflective particles.

5. The surface covering of claim 4 wherein the second printed layer is comprised of a printing ink containing decorative reflective particles.

6. The surface covering of claim 1 wherein the first printed layer is in the form of a design and the second printed layer is uniform and translucent or transparent and contains randomly dispersed decorative reflective particles.

7. The surface covering of claim 6 further comprising a smoothcoat layer overlaying the matrix layer wherein the second printed layer overlays the smoothcoat layer.

8. The surface covering of claim 7 further comprising a layer of print in the form of a pattern or design as a part of the second printed layer.

9. The surface covering of claim 1 wherein the plastic layer comprises a composition selected from the group consisting of latex or polyvinyl chloride.

10. The surface covering of claim 1 further comprising a smoothcoat layer overlaying the matrix layer wherein the second printed layer overlays the smoothcoat layer.

11. The surface covering of claim 1 wherein the first printed layer is in the form of a design.

12. A surface covering which comprises:

a) a backing sheet material;

b) a plastic layer overlaying said backing sheet material;

c) a first printed layer in the form of a design overlaying said plastic layer;

d) an adhesive matrix layer, which contains opaque spheroidal particles having an aspect ratio not greater than about 2:1, overlaying said first printed layer;

e) a second printed layer overlaying said matrix layer; and f) a wearlayer overlaying said second printed layer, wherein said first printed layer is visible through the layers overlaying it.

13. The surface covering of claim 12 further comprising, in the adhesive matrix layer, transparent or translucent spheroidal particles having an aspect ratio not greater than about 2:1.

14. The surface covering of claim 12 wherein the second printed layer is in the form of a design.

15. The surface covering of claim 14 wherein the second printed layer further contains decorative reflective particles.

16. The surface covering of claim 12 wherein the second printed layer is uniform and translucent or transparent and contains randomly dispersed decorative reflective particles.

17. The surface covering of claim 15 further comprising a layer of print in the form of a pattern or design as a part of the second printed layer.

* * * * *